3,395,230
BIS-PHENYL THIOCARBAMATE ESTER COMPOSITIONS
William Laszlo Bencze, New Providence, N.J., assignor to Ciba Corporation, New York, N.Y., a corporation of Delaware
No Drawing. Filed June 12, 1964, Ser. No. 374,849
4 Claims. (Cl. 424—300)

ABSTRACT OF THE DISCLOSURE

Topical antifungal pharmaceutical compositions containing compounds of the formula

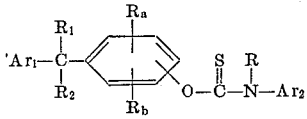

in which $Ar_1$ is aryl, each of the groups $R_1$ and $R_2$ is an aliphatic group, a cycloaliphatic group, a cycloaliphatic-aliphatic group, or when taken together a divalent aliphatic group, $Ar_2$ is aryl, the group R is hydrogen or an aliphatic group, and each of the groups $R_a$ and $R_b$ is hydrogen, lower alkyl, halogeno, or the group of the formula

in which $Ar_2$ and R have the previously-given meaning, as well as process for the preparation of such compounds.
The compositions are effective for fungicidal use.

---

The present invention concerns O-(N-substituted thiocarbamyl)-phenols. More especially, it relates to compounds of the formula

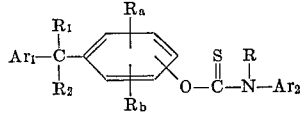

in which $Ar_1$ is aryl, each of the groups $R_1$ and $R_2$ is an aliphatic group, a cycloaliphatic group, a cycloaliphatic-aliphatic group, or when taken together, a divalent aliphatic group, $Ar_2$ is aryl, the group R is hydrogen or an aliphatic group, and each of the groups $R_a$ and $R_b$ is hydrogen, lower alkyl, halogeno, or the group of the formula

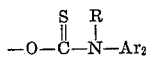

in which $Ar_2$ and R have the previously-given meaning, as well as process for the preparation of such compounds.

As mentioned above, the group Ar stands for aryl, more particularly carbocyclic aryl, and especially monocyclic carbocyclic aryl, e.g. phenyl or substituted phenyl, as well as bicyclic carbocyclic aryl, i.e. naphthyl, e.g. 1-naphthyl or 2-naphthyl, or substituted naphthyl, or heterocyclic aryl, particularly monocyclic heterocyclic aryl, such as pyridyl, e.g. 2-pyridyl, 3-pyridyl or 4-pyridyl, or substituted pyridyl, as well as bicyclic heterocyclic aryl. A substituted aryl group has one or more than one of the same or of different substituents which may be attached to any of the positions available for substitution. Substituents are, for example, lower alkyl, e.g. methyl, ethyl, n-propyl, isopropyl, n-butyl, tertiary butyl and the like, etherified hydroxyl, especially lower alkoxy, e.g. methoxy, ethoxy, n-propyloxy, isopropyloxy, n-butyloxy, secondary butyloxy and the like, esterified hydroxyl, particularly halogeno, e.g. fluoro, chloro, bromo or iodo, halogeno-lower alkyl, e.g. trifluoromethyl and the like, monocyclic carbocyclic aryl, e.g. phenyl or phenyl substituted by any of the above groups, or any other suitable substituent. The group $Ar_1$ is primarily represented by phenyl, (lower alkyl)-phenyl, (lower alkoxy)-phenyl, (halogeno)-phenyl, (trifluoromethyl)-phenyl, biphenylyl, naphthyl, pyridyl and the like.

Each of the two groups $R_1$ and $R_2$ stands for an aliphatic group, especially for lower alkyl, e.g. methyl, ethyl, n-propyl, isopropyl, n-butyl, isobutyl and the like. They may also represent cycloaliphatic groups, such as cycloalkyl, having from three to eight, especially from five to six, ring carbon atoms, e.g., cyclopropyl, cyclopentyl, cyclohexyl, cycloheptyl, cyclo-octyl and the like, cycloaliphatic-aliphatic groups, such as cycloalkyl-lower alkyl, in which cycloalkyl has from three to eight, especially from five to six, ring carbon atoms, e.g. cyclopropylmethyl, cyclopentylmethyl, 2-cyclopentylethyl, cyclohexylmethyl, 1-cyclohexylethyl, cycloheptylmethyl and the like. The groups $R_1$ and $R_2$ may be taken together and form a divalent aliphatic radical, especially lower alkylene having preferably from two to seven carbon atoms, e.g. 1,2-ethylene, 1,3-propylene, 1,4-butylene, 1,5-pentylene, 1,5-hexylene, 1,6-hexylene, 1,7-heptylene and the like.

The aryl group $Ar_2$ is carbocyclic aryl, especially monocyclic carbocyclic aryl, i.e. phenyl or substituted phenyl, as well as bicyclic carbocyclic aryl, i.e. naphthyl or substituted naphthyl, but may also be heterocyclic aryl, such as monocyclic heterocyclic aryl, e.g. pyridyl or substituted pyridyl, and the like. The above substituted groups may have one or more than one of the same or of different substituents attached to any position available for substitution; the latter are particularly lower alkyl, etherified hydroxyl, e.g. lower alkoxy, esterified hydroxyl, e.g. halogeno, halogeno-lower alkyl, e.g. trifluoromethyl, monocyclic carbocyclic aryl, e.g. phenyl and the like. The group $Ar_2$ is primarily represented by phenyl, (lower alkyl)-phenyl, (lower alkoxy)-phenyl, (halogeno)-phenyl, (trifluoromethyl)-phenyl, biphenylyl, naphthyl, pyridyl and the like.

An aliphatic group representing R, which also stands for hydrogen, is particularly lower alkyl, e.g. methyl, ethyl, n-propyl, isopropyl, n-butyl and the like, but may also be lower alkenyl, e.g. allyl, methylallyl and the like, as well as a cycloaliphatic group, such as cycloalkyl having from three to eight, preferably five to six, ring carbon atoms, e.g. cyclopropyl, cyclopentyl, cyclohexyl, cycloheptyl, cyclo-octyl and the like, a cycloaliphatic-aliphatic group, such as cycloalkyl-lower alkyl, in which cycloalkyl has from three to eight, especially from five to six, ring carbon atoms, e.g. cyclopropylmethyl, cyclopentylmethyl, 2-cyclopentylethyl, cyclohexylmethyl, 1-cyclohexylethyl, cycloheptylmethyl and the like, an araliphatic group, such as monocyclic carbocyclic aryl-lower alkyl, for example, phenyl-lower alkyl, e.g. benzyl, 1-phenylethyl, 2-phenylethyl and the like, or any other suitable substituent having aliphatic characteristics.

As noted above, each of the groups $R_a$ and $R_b$ stands for hydrogen, lower alkyl, e.g. methyl, ethyl, n-propyl, isopropyl, n-butyl, tertiary butyl and the like, halogeno, e.g. fluoro, chloro, bromo or iodo, or for the substituent of the formula $$-O-\overset{S}{\underset{\|}{C}}-\overset{R}{\underset{|}{N}}-Ar_2$$

in which $Ar_2$ and R have the previously-given meaning.
The compounds of this invention has antifungal properties and are, therefore, useful as antifungal agents.

Thus, they show antidermatophyte effects against fungi, causing superficial dermatophytoses, such as *Trichophyton mentagrophytes* and the like, and are, therefore, useful in the treatment of infections caused by such micro-organisms, particularly of fungal infections of the skin.

Particularly useful are the compounds of the formula

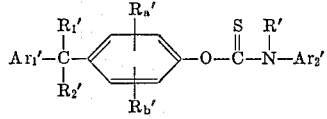

in which $Ar_1'$ is phenyl, (lower alkyl)-phenyl, (halogeno)-phenyl or 4-biphenylyl, each of the groups $R_1'$ and $R_2'$ is lower alkyl, particularly methyl, $Ar_2'$ is phenyl, (lower alkyl)-phenyl, (lower alkoxy)-phenyl, (halogeno)-phenyl or naphthyl, $R'$ is hydrogen or lower alkyl, and each of the groups $R_a'$ and $R_b'$ is hydrogen, lower alkyl, halogeno, or the group of the formula

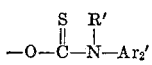

in which $Ar_2'$ and $R'$ have the previously-given meaning.

The compounds of the present invention are prepared according to methods known per se, for example, by converting in a compound of the formula

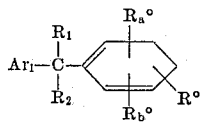

in which $Ar_1$, $R_1$ and $R_2$ have the previously-given meaning, $R°$ is a substituent capable of being converted into the group of the formula

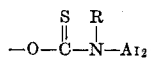

in which $Ar_2$ and $R$ have the previously-given meaning, and each of the groups $R_a'$ and $R_b'$ is hydrogen, lower alkyl, halogeno, or a substituent capable of being converted into the group of the formula

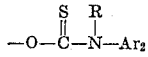

in which $Ar_2$ and $R$ have the previously-given meaning, or a salt thereof, the group $R°$, as well as any group $R_a°$ and/or $R_b°$, whenever representing a substituent capable of being converted into the group of the formula

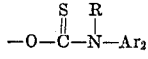

in which $Ar_2$ and $R$ have the previously-given meaning, into the group of the formula

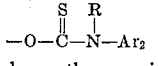

in which $Ar_2$ and $R$ have the previously-given meaning, and, if desired, replacing in a resulting compound, in which R is hydrogen, the latter by an aliphatic substituent.

A group representing $R°$, as well as $R_a°$ and/or $R_b°$, is hydroxyl or hydroxyl esterified with a thiocarbonic acid derivative; the conversion of such group into the desired group of the formula

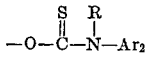

in which $Ar_2$ and $R$ have the previously-given meaning, is carried out according to known methods.

Thus, the conversion of a hydroxyl group into the desired substituent is carried out by reacting the starting material or a salt thereof, particularly an alkali metal salt thereof, with an isothiocyanate of the formula $S=C=N-Ar_2$, in which $Ar_2$ has the previously-given meaning, or with a thiocarbamic acid halide of the formula

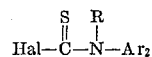

in which $Ar_2$ and R have the previously-given meaning, and Hal is halogeno, particularly chloro. The above reaction is carried out in the absence or presence of a solvent or solvent mixture, if necessary, while cooling or at an elevated temperature, in a closed vessel, and/or in the atmosphere of an inert gas, e.g. nitrogen.

Another group capable of being converted into the desired group of the formula

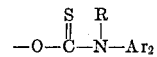

in which $Ar_2$ and R have the previously-given meaning, is hydroxyl esterified with a thiocarbonic acid derivative, especially a halogeno-thiocarbonic acid or a monoesterified dithiocarbonic acid. Such esterified hydroxyl group is represented by the formula

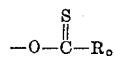

in which $R_o$ is halogeno, particularly chloro, or etherified mercapto, such as lower alkyl-mercapto, e.g. methylmercapto, ethylmercapto and the like, or substituted lower alkyl-mercapto, e.g. carboxy-lower alkyl-mercapto, e.g. carboxymethylmercapto and the like, esterified carboxy-lower alkyl-mercapto, e.g. carbomethoxymethylmercapto, carbethoxymethylmercapto and the like, phenyl-lower alkyl-mercapto, e.g. benzylmercapto and the like, carbocyclic arylmercapto, e.g. phenyl-mercapto and the like, or any other suitably etherified mercapto group. The starting material, in which $R°$, as well as $R_a°$ and/or $R_b°$, is hydroxyl esterified with a thiocarbonic acid derivative is reacted with an amine of the formula

in which $Ar_2$ and R have the previously-given meaning. The reaction is carried out in the absence or presence of a solvent or solvent mixture, if necessary, while cooling or at an elevated temperature, in a closed vessel, and/or in the atmosphere of an inert gas, e.g. nitrogen.

In a resulting compound, in which the nitrogen carries a hydrogen, the latter is replaced by an aliphatic radical according to known methods, for example, by forming a salt (e.g. treatment with a suitable salt-forming, especially an alkali metal salt-forming reagent, such as an alkali metal hydride or amide, e.g. lithium, sodium or potassium hydride or amide and the like, in the presence of an inert solvent or solvent mixture), and reacting the salt with a reactive ester of an aliphatic alcohol (e.g. an aliphatic halide, such as a lower alkyl, lower alkenyl, cycloalkyl, cycloalkyl-lower alkyl or monocyclic carbocyclic aryl-lower alkyl choride, bromide or iodide, an aliphatic sulfate, e.g. di-lower alkyl sulfate and the like, an aliphatic sulfonate, e.g. lower alkyl monocyclic carbocyclic aryl-sulfonate and the like), or by any other suitable procedure.

The starting material used in the above reaction is known or is prepared according to known methods, for example, by treating a compound of the formula

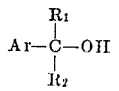

in which Ar, $R_1$ and $R_2$ have the previously-given meaning, with a phenolic compound of the formula

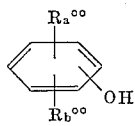

in which each of the groups $R_a^{\circ\circ}$ and $R_b^{\circ\circ}$ is hydrogen, lower alkyl, halogeno or hydroxyl, in the presence of a Lewis acid, particularly a Friedel-Crafts reagent, e.g. aluminum chloride and the like, to form the phenol starting material of the formula

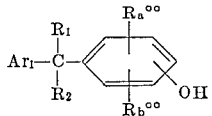

in which $Ar_1$, $R_1$, $R_2$, $R_a^{\circ\circ}$ and $R_b^{\circ\circ}$ have the previously-given meaning, and, if desired, converting a resulting compound into a salt thereof, and/or, if desired, converting in a resulting compound the hydroxyl group(s) into hydroxyl group(s) esterified with a thiocarbonic acid derivative.

The reaction of the alcohol component with the phenol compound to form the phenol starting material is usually carried out in the presence of an excess of the latter serving as the diluent.

The resulting compound is converted into a salt thereof by treatment with a salt-forming, especially an alkali metal salt-forming, reagent, such as an alkali metal hydride or amide, e.g. lithium hydride, sodium hydride, sodium amide, potassium amide and the like, or any other suitable reagent, such as an alkali metal hydroxide, e.g. lithium hydroxide, sodium hydroxide, potassium hydroxide and the like, or an alkali metal compound of a hydrocarbon, e.g. butyl lithium, phenyl lithium, phenyl sodium and the like, usually in the presence of a suitable solvent, e.g. liquid ammonia, hexane, benzene, toluene, xylene, diethyl ether, p-dioxane, tetrahydrofuran, diethyleneglycol dimethylether, N,N-dimethylformamide, ethanol and the like, or solvent mixture, the choice of which depends primarily on the type of reagent used and/or on the solubility properties of the starting material. Usually, the resulting salt is not isolated, but is directly employed either in the above reaction or in the preparation of starting materials having hydroxyl group esterified with a thiocarbonic acid derivative.

The latter are new and are intended to be included within the scope of the invention. They are represented by the compounds of the formula

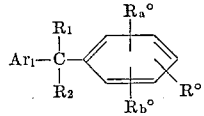

in which $Ar_1$, $R_1$ and $R_2$ have the previously-given meaning, $R^{\circ}$ is the group of the formula

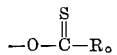

in which $R_\circ$ is halogeno or etherified mercapto (as previously indicated), and each of the groups $R_a^{\circ}$ and $R_b^{\circ}$ is hydrogen, lower alkyl, halogeno or the group of the formula

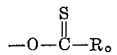

in which $R_\circ$ has the above given meaning. The starting materials are primarily those of the formula

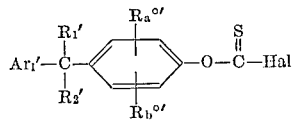

in which $Ar_1'$, $R_1'$, $R_2'$ and Hal have the previously-given meaning and each of the groups $R_a'^{\circ}$ and $R_b'^{\circ}$ is hydrogen, lower alkyl and the group of the formula

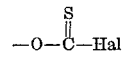

in which Hal has the previously-given meaning.

The starting material, in which the group capable of being converted according to the process of this invention is a hydroxyl group esterified with a halogeno-thiocarbonic acid, particularly chloro-thiocarbonic acid, is formed by reacting the phenol starting material, which is preferably used either in the form of a metal-salt, e.g. alkali metal salt, thereof or in the presence of a metal-salt forming reagent, e.g. an alkali metal hydroxide and the like, with a dihalogeno-thiocarbonate, particularly thiophosgene. The starting material, in which hydroxyl esterified with a monoesterified dithiocarbonic acid is the group capable of being converted according to the procedure of this invention, is prepared, for example, by reacting a salt, particularly an alkali metal salt, of the phenol starting material with carbon disulfide, and treating the resulting salt, particularly an alkali metal salt, of the resulting intermediate, in which hydroxyl is esterified with dithiocarbonic acid, with a suitable reactive ester of an alcohol, particularly an aliphatic halide, such as a lower alkyl halide, e.g. chloride, bromide or iodide, a di-lower alkyl sulfate or a substituted lower alkyl halide, for example, a halogeno-lower alkanoic acid or an ester thereof, e.g. a halogeno-acetic acid, or a lower alkyl halogeno-acetate and the like, a phenyl-lower alkyl halide, e.g. a benzyl halide and the like, as well as with a carbocyclic ary diazonium halide, or any other suitable reagent.

The invention also comprises any modification of the process wherein a compound formed as an intermediate at any stage of the process, is used as the starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

Example 1

To a mixture of 8.0 g. of 3,N-dimethyl-aniline in 100 ml. of chloroform is added dropwise over a period of thirty minutes a solution of 9.8 g. of 4-(2-phenyl-2-propyl)-phenyl chlorothiocarbonate in 150 ml. of chloroform while cooling with running tapwater; the internal temperature is 24°. The reaction mixture is then stirred for three hours and evaporated to dryness under reduced pressure. The residue is taken up into diethyl ether; the solid material is filtered off and washed with diethyl ether to yield the 3,N-dimethyl-aniline hydrochloride. The filtrate is evaporated to dryness to yield 20.0 g. of a clear, red oil, which is dissolved in 100 ml. of diethyl ether; the organic solution is washed with water, twice with 2 N aqueous sodium hydroxide, water and a concentrated solution of sodium chloride in water, dried over sodium sulfate, and evaporated to dryness. The resulting 4-(2-phenyl-2-propyl)-phenyl N-methyl-N-(3-methyl-phenyl)-thiocarbamate of the formula

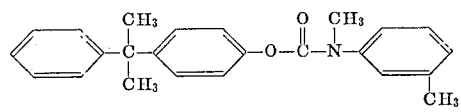

is purified by distillation and recovered at 200–205°/0.1 mm.; yield: 9.0 g. The yellow glassy material crystallizes from a mixture of hexane and pentane, and melts at 83–84°.

The starting material used in the above procedure is prepared as follows: A solution of 21.0 g. of 4-(2-phenyl-2-propyl)-phenol in a mixture of 4.1 g. of sodium hydroxide in 250 ml. of water is obtained by warming and is then cooled in an ice-bath, whereupon a white precipitate is formed. The resulting mixture is added over a period of twenty minutes to a solution of 12.0 g. of thiophosgene in 200 ml. of chloroform while maintaining the temperature at 4–8° and stirring. After stirring for an additional thirty minutes at room temperature, the orange milky chloroform layer is separated, washed with a solution of 10 ml. of 2 N hydrochloric acid in 100 ml. of water, dried over sodium sulfate and evaporated under reduced pressure. The resulting 4-(2-phenyl-2-propyl)-phenyl chlorothiocarbonate of the formula

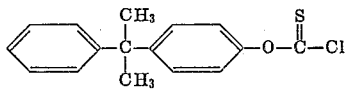

is purified by distillation and recovered at 145–170°/0.2 mm.; yield: 19.5 g.

Example 2

A solution of 9.8 g. of 4-(2-phenyl-2-propyl)-phenyl chlorothiocarbonate in 150 ml. of chloroform is added dropwise over a period of thirty minutes to a solution of 11.0 g. of 3,4-dichloro-aniline while stirring and cooling with running tapwater, the inside temperature being 20–22°. The excess of the 3,4-dichloro-aniline precipitates as the hydrochloride and is filtered off after stirring for ninety minutes. The filtrate is concentrated under reduced pressure to a volume of about 50 ml. and is diluted with 50 ml. of petroleum ether. After thirty minutes, the crystalline 4-(2-phenyl-2-propyl)-phenyl N-(3,4-dichloro-phenyl)-thiocarbamate of the formula

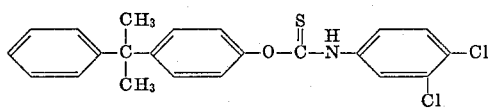

precipitates and is filtered off; yield: 10.5 g. It is dissolved in 150 ml. of warm chloroform; the organic solution is washed with water and 2 N aqueous sodium carbonate, swirled with sodium chloride, dried over sodium sulfate and evaporated to dryness under reduced pressure. Upon adding petroleum ether, the residue crystallizes; the precipitate is filtered off and melts at 145–148°.

Upon treatment of a solution of 4-(2-phenyl-2-propyl)-phenyl N-(3,4-dichloro-phenyl)-thiocarbamate in a mixture of toluene and N,N-dimethylformamide with an equivalent amount of a 53 percent suspension of sodium hydride in mineral oil and an equimolar amount of ethyl bromide, the 4-(2-phenyl-2-propyl)-phenyl N-ethyl-N-(3,4-dichloro-phenyl)-thiocarbamate is obtained.

Example 3

The following compounds are prepared according to the above-described and illustrated procedure by selecting the appropriate starting materials:

| Starting Material | Reagent | Final Product |
| --- | --- | --- |
| 4-(2-phenyl-2-propyl)-phenyl chlorothiocarbonate. | 4-methoxy-N-methyl-aniline | 4-(2-phenyl-2-propyl)-phenyl N-(4-methoxy-phenyl)-N-methyl-thiocarbamate. |
| Do | N-ethyl-3-trifluoromethyl-aniline | 4-(2-phenyl-2-propyl)-phenyl N-ethyl-N-(3-trifluoromethyl-phenyl)-thiocarbamate. |
| Do | N-benzyl-aniline | 4-(2-phenyl-2-propyl)-phenyl N-benzyl-N-phenylthiocarbamate. |
| Do | N-methyl-2-naphthylamine | 4-(2-phenyl-2-propyl)-phenyl N-methyl-N-(2-naphthyl)-thiocarbamate. |
| 4-[2-(4-chloro-phenyl)-2-propyl]-phenyl chlorothiocarbonate. | 3,N-dimethyl-aniline | 4-[2-(4-chloro-phenyl)-2-propyl]-phenyl N-methyl-N-(3-methyl-phenyl)-thiocarbamate. |
| Do | N-cyclohexyl-aniline | 4-[2-(4-chloro-phenyl)-2-propyl]-phenyl N-cyclohexyl-N-phenyl-thiocarbamate. |
| 4-[3-(4-methyl-phenyl)-3-pentyl]-phenyl chlorothiocarbonate. | 2-chloro-N-isopropyl-6-methyl-aniline | 4-[3-(4-methyl-phenyl)-3-pentyl]-phenyl N-isopropyl-N-(2-chloro-6-methyl-phenyl)-thiocarbamate. |
| 4-[2-(4-biphenylyl)-2-propyl]-phenyl chlorothiocarbonate. | 4-bromo-N-methyl-aniline | 4-[2-(4-biphenylyl)-2-propyl]-phenyl N-(4-bromophenyl)-N-methyl-thiocarbamate. |
| 4-(1-phenyl-1-cyclohexyl)-phenyl chlorothiocarbonate. | 4-fluoro-N-methyl-aniline | 4-(1-phenyl-1-cyclohexyl)-phenyl N-(4-fluoro-phenyl)-N-methyl-thiocarbamate. |
| 2-chloro-4-(2-phenyl-2-propyl)-phenyl chlorothiocarbonate. | N-methyl-2-pyridyl-amine | 2-chloro-4-(2-phenyl-2-propyl)-phenyl N-methyl-N-(2-pyridyl)-thiocarbamate. |
| 2-chloro-6-methyl-4-(2-phenyl-2-propyl)-phenyl chlorothiocarbonate. | N-ethyl-1-naphthylamine | 2-chloro-6-methyl-4-(2-phenyl-2-propyl)-phenyl N-ethyl-N-(1-naphthyl)-thiocarbamate. |
| 2-[3,4-di-(chlorothiocarbonyloxy)-phenyl]-2-phenyl-propane. | 3,N-dimethyl-aniline | 2-{3,4-di-[N-methyl-N-(3-methyl-phenyl)-thiocarbamyloxy]-phenyl}-2-phenyl-propane. |
| 2-(4-chloro-phenyl)-2-[2,4-di-(chlorothiocarbonyloxy)-phenyl]-propane. | 4-ethoxy-N-methyl-aniline | 2-(4-chloro-phenyl)-2-{2,4-di-[N-(4-ethoxy-phenyl)-N-methyl-thiocarbamyloxy]-phenyl}-propane. |

Example 4

The compounds of this invention, being useful, for example, in the treatment of superficial dermatophytoses, are used in the form of pharmaceutical compositions for topical use comprising a pharmacologically effective amount, for example from about 0.1 percent to about 10 percent, especially from about 0.5 percent to about 5 percent, of the pharmacologically active ingredient, i.e. one of the compounds having the previously-given formula, particularly of a compound having the following formula

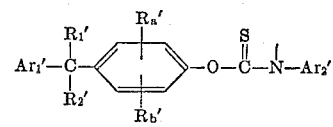

in which $Ar_1'$, $Rr_2'$, $R_1'$, $R_2'$, $R_a'$, $R_b'$ and $R'$ have the previously-given meaning, and a pharmaceutically acceptable carrier for topical use. The composition for topical use is advantageously an emulsion preparation, e.g. cream, ointment, lotion and the like, which, apart from the pharmacologically active ingredient, contains the usual carrier substances for such preparations, e.g. water, benzyl acohol, cetyl alcohol, propylene glycol, polyethylene glycol, polysorbate, stearic acid, sodium lauryl sulfate, glyceryl monostearate, isopropyl myristate, sorbitan sesquioleate, lanolin, white petrolatum, liquid petrolatum, spermaceti or any other suitable carrier material, and, if necessary, auxiliary substances, such as preserving agents, e.g. phenyl mercuric acetate and the like, as well as stabilizing, wetting, emulsifying, coloring agents and the like. The compositions, which may contain other pharmacologically active ingredients, particularly other antimicrobial agents, are prepared according to the standard methods employed in the art as exemplified below:

An ointment containing 1 percent of 4-(2-phenyl-2-propyl)-phenyl N-methyl-N-(3-methyl-phenyl)-triocarbamate as the active ingredient is prepared as follows (for 100.0 g.).

Ingredients: Grams
4-(2-phenyl-2-propyl)-phenyl N-methyl-N-(2-
methyl-phenyl)-thiocarbamate _____ 1.0
Liquid petrolatum _____ 5.0
White petrolatum _____ 94.0

The 4-(2-phenyl-2-propyl)-phenyl N-methyl-N-(3-methyl-phenyl)-thiocarbamate is mixed with the liquid petrolatum by using a mortar until an adequate reduction in particle size is accomplished. The white petrolatum is then slowly blended with this mixture; the ointment is passed through a three roller mill, until total uniformity is obtained and filled into epoxy-lined tubes (5.0 g.).

A cream, containing 1 percent of 4-(2-phenyl-2-propyl) - phenyl N - methyl - N-(3-methyl-phenyl)-thiocarbamate as the active ingredient is prepared as follows (for 100.0 g.).

Ingredients: Grams
4-(2-phenyl-2-propyl)-phenyl N-methyl-N-(3-
methyl-phenyl)-thiocarbamate _____ 1.0
Propylene glycol _____ 15.0
Sodium lauryl sulfate _____ 2.0
Cetyl alcohol _____ 15.0
Phenyl mercuric acetate _____ 0.002
Purified water q.s. _____ 100.0

The phenylmercuric acetate is dissolved in 65 ml. of water at 90°; subsequently the sodium lauryl sulfate is added and the temperature is reduced to 70°. The cetyl alcohol is melted at 70° and added to the aqueous solution while vigorously agitating. Stirring is continued while cooling the mixture to 45°.

The 4-(2-phenyl-2-propyl)-phenyl N-methyl-N-(3-methyl-phenyl)-thiocarbamate is dispersed in the propylene glycol at 45° and added to the above emulsion while agitating. Sufficient water is added to bring the weight to 100 g., and mixing is continued while the product cools to room temperature. The cream is passed through a three roller mill until total uniformity is accomplished and is filled into epoxy-lined tubes (5 g.).

A cream containing 2 percent of 4-(2-phenyl-2-propyl)-phenyl N - methyl - N-(3-methyl-phenyl)-thiocarbamate as the active ingredient is prepared as follows (for 3000.0 g.).

Ingredients: Grams
4-(2-phenyl-2-propyl)-phenyl N-methyl-N-
(3-methyl-phenyl)-thiocarbamate _____ 60.0
Glyceryl monostearate _____ 225.0
Lanolin, anhydrous _____ 30.0
Isopropyl myristate _____ 90.0
Polyethylene glycol 4000 monostearate ____ 300.0
Stearic acid _____ 390.0
Sorbitan sesquioleate _____ 15.0
Spermaceti _____ 180.0
Propylene glycol _____ 150.0
Polysorbate 60 _____ 45.0
Purified water _____ 1515.0

The glyceryl monostearate, the lanolin, the isopropyl myristate, the polyethylene glycol 4000 monostearate, the stearic acid, the sorbitan sesquioleate, and the spermaceti are melted together at 80° on the water bath. The water containing the polysorbate 60 is added while stirring at 80°; stirring is continued until the temperature drops below 40°. The mixture of the 4-(2-phenyl-2-propyl)-phenyl N-methyl-N-(3-methyl-phenyl)-thiocarbamate in propylene glycol is added; stirring is continued and water is added to bring the weight to 3000.0 g. The cream is passed through a homogenizer and filled into tubes.

What is claimed is:
1. A pharmaceutical composition for topical use comprising a fungicidally effective amount of a compound of the formula

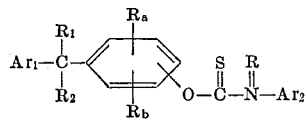

in which each of $Ar_1$ and $Ar_2$ is a member selected from the group consisting of phenyl, naphthyl, phenyl substituted by a member selected from the group consisting of lower alkyl, lower alkoxy, halogeno, halogeno-lower alkyl and phenyl, and naphthyl substituted by a member selected from the group consisting of lower alkyl, lower alkoxy, halogeno, halogeno-lower alkyl and phenyl, each of the groups $R_1$ and $R_2$ is a member selected from the group consisting of lower alkyl, cycloalkyl having 3 to 8 carbon atoms, cycloalkyl-lower alkyl in which cycloalkyl has 3 to 8 carbon atoms and, when taken together, lower alkylene of 2 to 7 carbon atoms, the group R is a member selected from the group consisting of hydrogen, lower alkyl, lower alkenyl, cycloalkyl having 3 to 8 carbon atoms, cycloalkyl-lower alkyl in which cycloalkyl has 3 to 8 carbon atoms and phenyl-lower alkyl, and each of the groups $R_a$ and $R_b$ is a member selected from the group consisting of hydrogen, lower alkyl, halogeno and the group of the formula

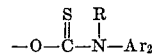

in which $Ar_2$ and R have the previously-given meaning, as the pharmacologically active ingredient, and a pharmaceutically acceptable carrier.

2. A pharmaceutical composition for topical use comprising from about 0.1 percent to about 10 percent of a compound of the formula

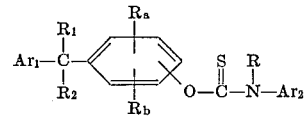

in which each of $Ar_1$ and $Ar_2$ is a member selected from the group consisting of phenyl, naphthyl, phenyl substituted by a member selected from the group consisting of lower alkyl, lower alkoxy, halogeno, halogeno-lower alkyl and phenyl, and naphthyl substituted by a member selected from the group consisting of lower alkyl, lower alkoxy, halogeno, halogeno-lower alkyl and phenyl, each of the groups $R_1$ and $R_2$ is a member selected from the group consisting of lower alkyl, cycloalkyl having 3 to 8 carbon atoms, cycloalkyl-lower alkyl in which cycloalkyl has 3 to 8 carbon atoms and, when taken together, lower alkylene of 2 to 7 carbon atoms, the group R is a member selected from the group consisting of hydrogen, lower alkyl, lower alkenyl, cycloalkyl having 3 to 8 carbon atoms, cycloalkyl-lower alkyl in which cycloalkyl has 3 to 8 carbon atoms and phenyl-lower alkyl, and each of the groups $R_a$ and $R_b$ is a member selected from the group consisting of hydrogen, lower alkyl, halogeno and the group of the formula

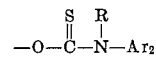

in which $Ar_2$ and R have the previously-given meaning, as the pharmacologically active ingredient, and a pharmaceutically acceptable carrier.

3. A pharmaceutical composition for topical use comprising from about 0.1 percent to about 10 percent of a compound of the formula

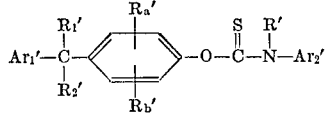

in which $Ar_1'$ is a member selected from the group consisting of phenyl, (lower alkyl)-phenyl, (halogeno)-phenyl and 4-biphenylyl, each of the groups $R_1'$ and $R_2'$ is lower alkyl, $Ar_2'$ is a member selected from the group consisting of phenyl, (lower alkyl)-phenyl, (lower alkoxy)-phenyl, (halogeno)-phenyl and naphthyl, the group $R'$ is a member selected from the group consisting of hydrogen and lower alkyl, and each of the groups $R_a'$ and $R_b'$ is a member selected from the group consisting of hydrogen, lower alkyl, halogeno and the group of the formula

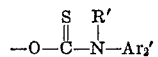

in which $Ar_2'$ and $R'$ have the above-given meaning, as the pharmacologically active ingredient, and a pharmaceutically acceptable carrier.

4. A pharmaceutical composition for topical use comprising from about 0.1 percent to about 10 percent of 4-(2-phenyl-2-propyl)-phenyl N-methyl-N-(3-methylphenyl)-thiocarbamate as the pharmacologically active ingredient, and a pharmaceutically acceptable carrier.

References Cited
FOREIGN PATENTS
880,030  10/1961  Great Britain.

ALBERT T. MEYERS, *Primary Examiner.*

D. R. MAHANAND, *Assistant Examiner.*